United States Patent
Kikuchi et al.

(10) Patent No.: US 6,499,047 B2
(45) Date of Patent: Dec. 24, 2002

(54) COMPUTER AND RECORDING MEDIUM INCLUDING A THREAD MANAGEMENT PROGRAM FOR LIMITING THREADS

(75) Inventors: Toshiki Kikuchi, Tokyo (JP); Yasuhiko Yokote, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/076,908

(22) Filed: May 13, 1998

(65) Prior Publication Data

US 2001/0011292 A1 Aug. 2, 2001

(30) Foreign Application Priority Data

May 14, 1997 (JP) ............................................. 09-124442

(51) Int. Cl.[7] ............................................... G06F 9/00
(52) U.S. Cl. ................................................... 709/100
(58) Field of Search ................................. 709/100, 102, 709/104, 313, 328

(56) References Cited

U.S. PATENT DOCUMENTS 5,455,951 A * 10/1995 Bolton et al. ............... 709/103
5,675,796 A * 10/1997 Hodges et al. .............. 709/100
5,706,515 A * 1/1998 Connelly et al. ............ 709/106
5,740,362 A * 4/1998 Buickel et al. ............... 707/10
5,752,031 A * 5/1998 Cutler et al. ................ 709/103
5,862,376 A * 1/1999 Steele, Jr. et al. .......... 395/677
5,898,832 A * 4/1999 Feridun ....................... 709/203
5,991,792 A * 11/1999 Nageswaran ................ 709/102
6,026,428 A * 2/2000 Hutchison et al. .......... 709/108
6,167,424 A * 12/2000 Bak et al. .................... 709/100

FOREIGN PATENT DOCUMENTS

WO   WO 9618148   *   6/1996   ............. G06F/9/46

* cited by examiner

Primary Examiner—Zarni Maung
Assistant Examiner—George L. Opie
(74) Attorney, Agent, or Firm—Jay H. Maioli

(57) ABSTRACT

A computer-readable recording medium is disclosed which comprises a class including, as application program interfaces, a procedure for starting a thread management program which receives a request message to create a thread processes the thread based on the request message; a procedure for terminating the thread management program; and a procedure for registering into the thread management program what is processed by the thread.

2 Claims, 5 Drawing Sheets

```
public final class Dispatcher { public static Dispatcher Create (int maxThread);

public void Destroy ( );

public void Send (Entry function, byte [] params, int paramSize);

public Id Ask (Entry function, byte [] params, int paramSize);

public void Reply (Object reply);

public Object GetReply (Id id);

public Entry Register (Object action);

public void Unregister (Entry entry);

}
```

```
public class Sample { private Dispatcher dispatch;

private Entry footEntry;

private Entry barEntry;

public void foo (byte [] msg, int size) {

CONTENT OF ACTION "foo"

CREATE REPLY MESSAGE "REPLY"

dispatch. Reply (reply);

} public void bar (byte [] msg, int size) {

CONTENT OF ACTION "bar"

} public static void main (String [] args) { dispatch = Dispatcher : Create (1);

fooEntry = dispatch. Register (this. foo);

barEntry = dispatch. Register (this. bar);

COMPUTER AND RECORDING MEDIUM INCLUDING A THREAD MANAGEMENT PROGRAM FOR LIMITING THREADS

BACKGROUND OF THE INVENTION

1. Field of the Invention

The present invention relates to a computer-readable recording medium having recorded therein an operating system, and a computer-readable recording medium having recorded therein an application program which is executed using the operating system.

2. Description of Related Art

Conventionally, for implementing, using a computer, an application program comprising a program module which receives a request message to effect a predetermined processing, it is necessary to state procedures which are to be followed by a receiver of the request message as shown in FIG. 1.

More specifically, a master thread is first created to receive the request message. The master thread produces a so-called message box to receive the request message at Step S1. An external request message will be passed to this message box.

The master thread monitors whether there exists a request message passed to the message box. A request message, if any, is received at Step S2. A slave thread to be processed based on the request message will be created at Step S3.

The slave thread thus created is processed in a predetermined manner based on the request message at Step S4. As a result of the predetermined processing, a reply message is sent to the master thread at Step S5. Thereafter, the slave thread is terminated at Step S6.

For implementing an application program which receives a request message to effect a predetermined processing as in the above, it is necessary to state the application program down to a slave thread in detail as having been mentioned above.

In many application programs, a program module which receives a request message to effect a predetermined processing is used very frequently. For the conventional application programs, procedures as mentioned above are stated for each of such program modules. Therefore, the creation of an application program requires much labor for statement of such procedures.

In the processing shown in FIG. 1, a slave thread is repeatedly created and terminated for each request message. However, the creation and termination of a thread needs relatively many calculations. Thus, the thread creation and terminal interfere with an improvement of program execution efficiency.

In the processing in FIG. 1, each time a request message is received, a thread is created. Taking dynamic resources into consideration, however, it is desirable in many cases to set an upper limit for a number of threads which can be created simultaneously. When it is necessary to set such an upper limit for a number of threads which can be executed simultaneously, it is necessary to state further complicated procedures, which takes much labor for programming.

SUMMARY OF THE INVENTION

The present invention has a major object to overcome the above-mentioned drawbacks of the prior art by providing a computer-readable recording medium having recorded therein an operating system permitting to easily state an application program comprising a program module which receives a request message to effect a predetermined processing.

According to an aspect of the present invention, the above object can be accomplished by providing a computer-readable recording medium having recorded therein an operating system comprising, as application program interfaces, a command to start a thread management program which receives a request message to create a thread which is processed based on the request message; a command to terminate the thread management program; and a command to register into the thread management program what is processed by the thread.

In addition, the operating system should desirably comprise a command to pass the request message to the thread management program, a command to have the thread management program output a reply message, a command to receive the reply message, or the like.

According to another aspect of the present invention, the above object can be accomplished by providing a computer-readable recording medium having recorded therein an operating system comprising a class including, as application program interfaces, a procedure of starting a thread management program which receives a request message to create a thread which is processed based on the request message, a procedure of terminating the thread management program, and a procedure of registering into the thread management program what is processed by the thread.

The "class" referred to herein is an object having an information for creating and erasing the object. By sending a creation request message to a class object, a new object is created.

According to still another aspect of the present invention, the above object can also be accomplished by providing a computer-readable recording medium having recorded therein an application program which is executed using an operating system comprising, as application program interfaces, a command to start a thread management program which receives a request message to create a thread which is processed based on the request message, a command to terminate the thread management program, and a command to register into the thread management program what is processed by the thread.

According to yet another aspect of the present invention, the above object can be accomplished by providing a computer-readable recording medium having recorded therein an application program which is executed using an operating system comprising a class including, as application program interfaces, a procedure of starting a thread management program which receives a request message to create a thread which is processed based on the request message, a procedure of terminating the thread management program, and a procedure of registering into the thread management program what is processed by the thread.

BRIEF DESCRIPTION OF THE DRAWINGS

These objects and other objects, features and advantages of the present intention will become more apparent from the following detailed description of the preferred embodiments of the present invention when taken in conjunction with the accompanying drawings, of which:

FIG. 5 shows an example of program module statement; and

DETAILED DESCRIPTION OF THE PREFERRED EMBODIMENTS

First, an example of a computer system to which the present invention is applied will be described below.

Figure 1:
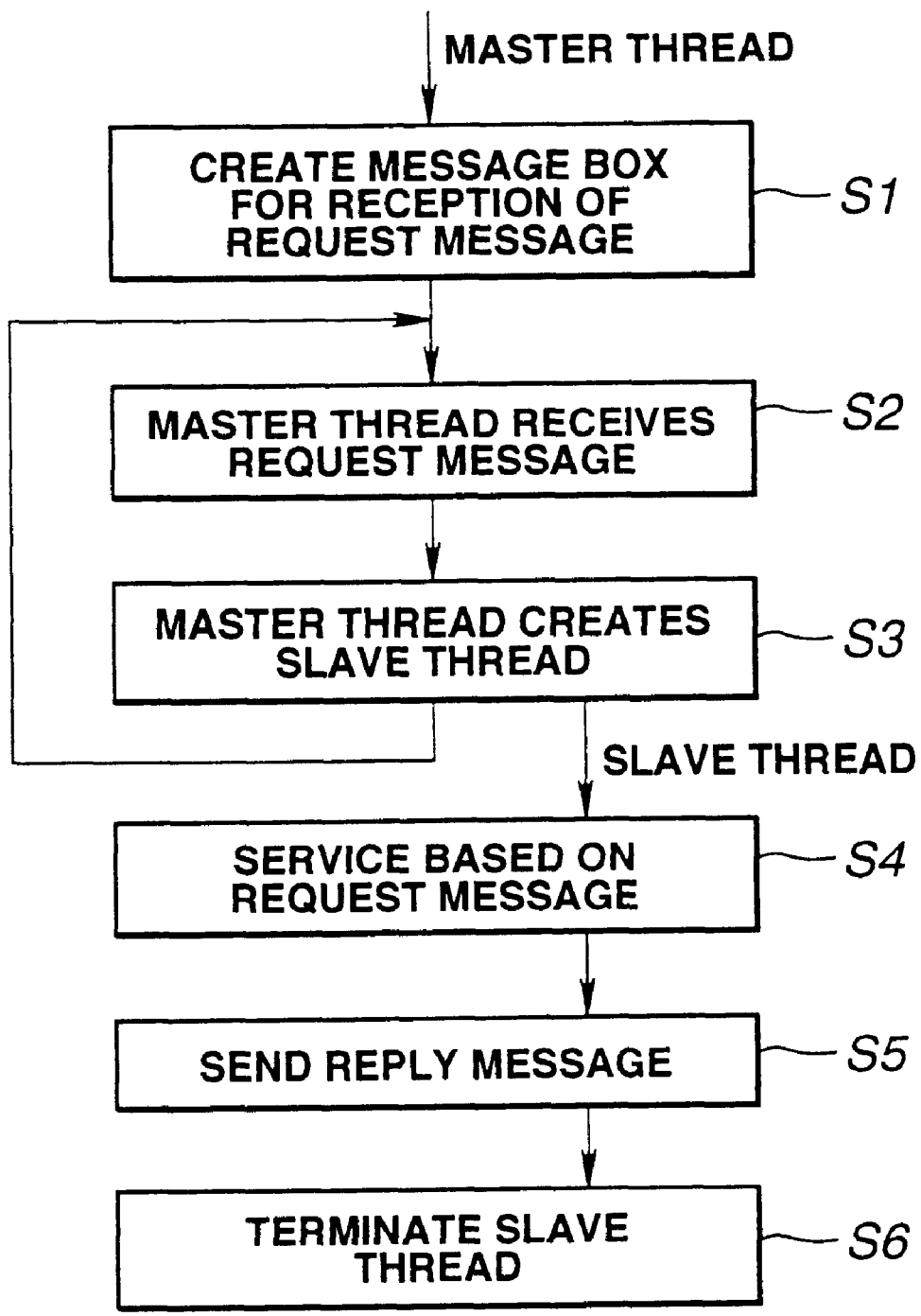
FIG. 1 illustrates a flow of a conventional processing for a program module which receives a request message to effect a predetermined processing.
Figure 2:
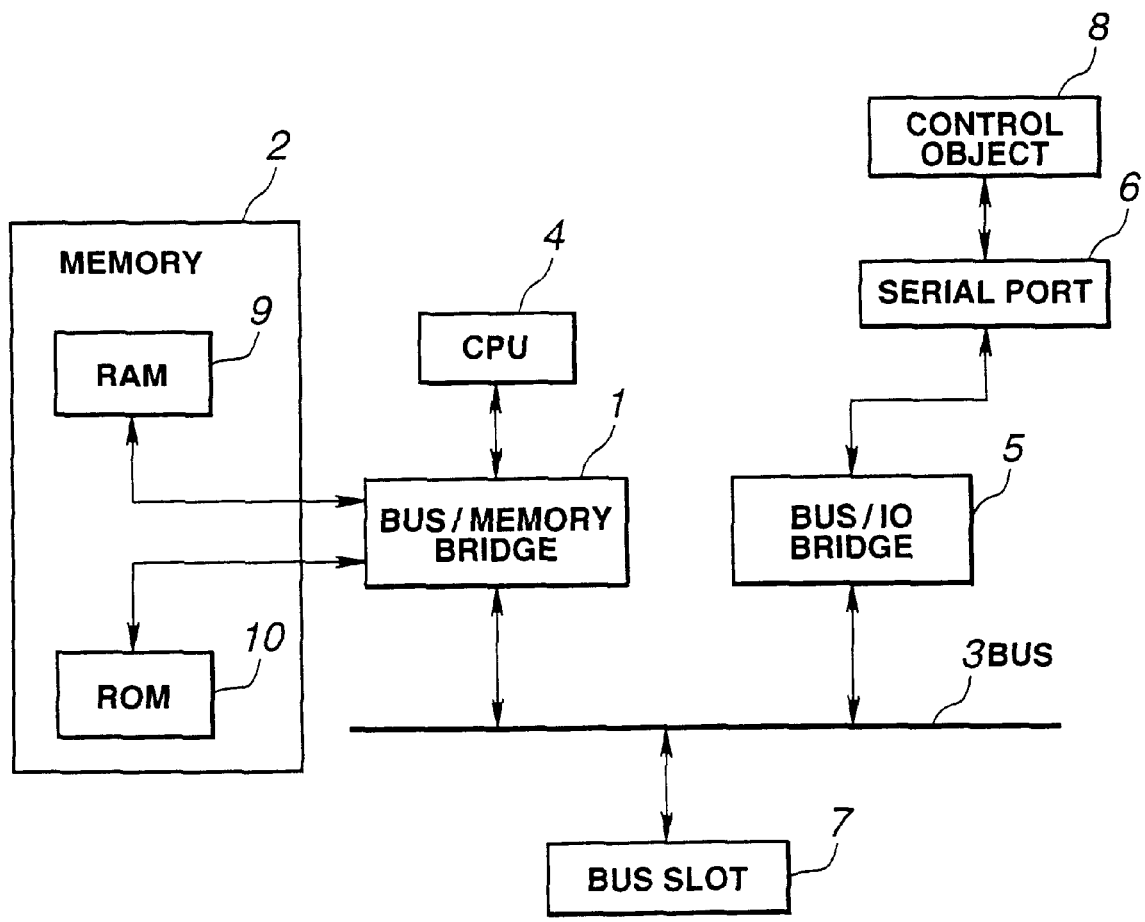
FIG. 2 is a schematic block diagram showing an example of a computer system to which the present invention is applied.

The computer system is incorporated in an AV (audio and visual) apparatus such as a video tape recorder, video disk player, audio tape recorder, audio disk player, etc. to control the AV apparatus. As shown in FIG. 2, it comprises a bus/memory bridge 1 which connects a memory 2 and bus 3 to a central processing unit (CPU) 4, a bus/IO bridge 5 which connects a serial port 6 to the bus 3, and a bus slot 7 connected to the bus 3. Thus, the bus 3 is a medium of signal transfer between the bridges 1 and 5 and bus slot 7.

The CPU 4 provides a calculation, and an AV apparatus in which the computer system is incorporated is controlled based on the calculation by the CPU 4. The serial port 6 is connected to a controlled object 8 of the AV apparatus in which the computer system is incorporated. Control signals are transferred between the computer system and controlled object 8 via the serial port 6. The bus slot 7 is a slot used for a functional expansion of the computer system or AV apparatus, and is adapted for connection of an apparatus required in an intended functional expansion.

The memory 2 comprises a rewritable RAM (Random Access Memory) 9 and a read-only ROM (Read-Only Memory) 10. The CPU 4 reads or writes data from or into the RAM 9 or ROM 10 via the bus/memory bridge 1 as necessary. The ROM 10 has previously recorded therein an operating system which provides a basic management of the computer system, while the RAM 9 saves an application program required for controlling the AV apparatus. The application program for control of the AV apparatus may previously be saved in the ROM 10.

The basic configuration of the computer system is as described above. It is of course possible that the computer system to which the present invention is applied may comprise other than described above. More specifically, the computer system to which the present invention is applied may comprise a communication device such as a modem or terminal adapter, or an external memory such as a hard disk unit, flexible disk unit or magnetic tape unit, or a display unit such as a CRT display or liquid crystal (LC) display, or an output device such as a printer, plotter or the like.

Also the computer system has been described to be incorporated in an AV apparatus. Needless to say, however, the present invention is not applicable only to the computer system intended to control an AV apparatus, but also to a versatile computer system. Since the present invention allows a resource such as a memory, etc. to be efficiently available, the present invention will be specially effective for application to a small computer system required to efficiently make use of a limited resource.

The computer-readable recording medium of the present invention is one having recorded therein an operating system used to start a computer system of the above-mentioned type, and one having recorded therein an application program which is executed using the operating system. That is to say, the above-mentioned memory 2 is one of the possible applications of example of the recording medium as an the present invention.

The operating system (will be referred to as "OS" hereafter) is object-oriented and comprises some classes as application program interfaces (will be referred to as "API" hereafter).

The OS used in the present invention comprises, as one of classes included as API, a class called "dispatcher" handling a thread management program (will be referred to as "dispatcher" hereafter) which receives a request message to create a thread which is processed based on the request message. The present invention introduces an element called "dispatcher" as API.

The dispatcher is adapted to receive a request message as will be described later. Therefore, the dispatcher may be considered as a kind of message box. Different from the conventional message box, however, the dispatcher does not only receive a request message but also manages a thread which effects a processing based on the request message.

Figures 3, 4:
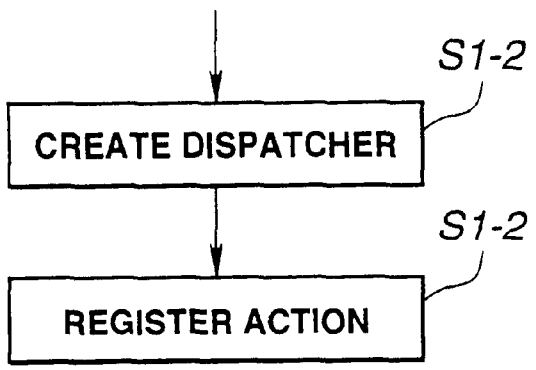
FIG. 3 illustrates the configuration of a class "dispatcher"
FIG. 4 illustrates a flow of a processing in which a dispatcher is used.

The class called "dispatcher" comprises a plurality of procedures generally each called a "method" oriented for objects as shown in FIG. 3. The class and method will be explained herein with special names given to them. However, it should be noted that the class and method in the present invention are not limited only to such naming. They may be called appropriately.

As shown in FIG. 3, the class "dispatcher" comprises methods "public static Dispatcher Create (int maxThread)", "public void Destroy ()", "public void Send (Entry function, byte [] params, int paramSize)", "public ID Ask (Entry function, byte [] params, int paramSize)", "public void Reply (Object reply)", "public Object GetReply Id id)", "public Entry Register (Object action)" and "public void Unregister (Entry entry)".

The method "public static Dispatcher Create (int maxThread)" is a procedure for starting a dispatcher. The argument "maxThread" sets an upper limit of threads created simultaneously. More specifically, threads created by the dispatcher are less in number than those set in the argument "maxThread".

When the method "public static Dispatcher Create (int maxThread)" is invoked by the program module of the application program, the OS will start the dispatcher. At this time, the threads created simultaneously by the dispatcher are less in number than those set in the argument "maxThread".

The method "public void Destroy ()" is a procedure for terminating the dispatcher. That is to say, when the method "public void Destroy ()" is invoked by the program module of the application program, the OS will terminate the dispatcher.

The method "public void Send (Entry function, byte [] params, int paramSize)" is a procedure for passing the request method to the dispatcher. This method is used when no reply message is required.

The argument "function" in this method public void Send (Entry function, byte [] params, int paramSize)" designates a processing (will be referred to as "action" hereafter) which is to be invoked by the request message. The argument "params" designates a number of the arguments "params".

When the method "public void Send (Entry function, byte [] params, int paramSize)" is invoked by the program module of the application program, the OS will invoke an action designated with the argument "function" and pass to the action an argument designated with the argument "params", thus executing the action.

The method "public Id Ask (Entry function, byte [] params, int paramSize)" is a procedure for passing a request message to the dispatcher. This method is used when a reply message is required.

The argument "function" in this method designates an action which is to be invoked by the request message. The argument "params" designates an argument necessary for invoking the action. The argument "paramSize" designates a number of the arguments "params".

When the method "public Id Ask (Entry function, byte [] params, int paramSize)" is invoked by the program module of the application program, the OS invokes an action designed with the argument "function" and passes to the action an argument designated by the argument "params", thus executing the action.

The method "public void Reply (Object reply)" is a procedure for having the dispatcher output a reply message, and it is used for returning a reply message from the dispatcher. In this method "public void Reply (Object reply)", the argument "reply" designates a reply message from the dispatcher.

When the method "public void Reply (Object reply)" is invoked by the program module of the application program, the OS will have the dispatcher output a reply message designated by the argument "reply".

The method "public Object GetReady (Id id)" is a procedure for receiving a reply message from the dispatcher. It is used for reception of the reply message from the dispatcher. In this method "public Object GetReady (Id id), the argument "id" designates a return value from the method "public Id Ask (Entry function, byte [] params, int paramSize)".

When the method "public Object GetReady (Id id)" is invoked by the program module of the application program, the OS passes as a reply message to the program module of the application program a return value designated with the argument "id".

The method "public Entry Register (Object action)" is a procedure for registering an action to be processed in the thread into the dispatcher. In this method "public Entry Register (Object action)", the argument "action" designates an action to be registered into the dispatcher.

The return value from the method "public Entry Register (Object action)" is used in the methods "public void Send (Entry function, byte [] params, int paramSize)" and "public Id Ask (Entry function, byte [] params, int paramSize)" to invoke actions. When the method "public Entry Register (Object action)" is invoked by the program module of the application program, the OS registers into the dispatcher an action designated with the argument "action".

When the method "public Entry Register (Object action)" is invoked, the OS registers an action designated by the argument "action" into the dispatcher.

The method "public void Unregister (Entry entry)" is a procedure for deleting an action having been registered into the dispatcher as an action to be processed in the thread. In this method "public void Unregister (Entry entry)", the argument "entry" designates an action to be deleted from the dispatcher.

When the method "public void Unregister (Entry entry)" is invoked by the program module of the application program, the OS deletes from the dispatcher the action designated with the argument "entry".

Using a class "Dispatcher" as have been described in the foregoing, it is possible to state very plainly a program module which receives a request message to effect an action and also to implement the action very efficiently.

When using the class "Dispatcher", dispatcher start and action registering, for example, are first done as shown in FIG. 4. First at Step S1-1, the method "public void Dispatcher Create (int maxThread)" is used to start the dispatcher. Thereafter, at Step S1-2, the method "public Entry Register (Object action)" is used to register an action into the dispatcher.

After that, the methods "public void Send (Entry function, byte [] params, int paramSize)" and "public Id Ask (Entry function, byte [] params, int paramSize)" are used as necessary to invoke an action registered in the dispatcher and execute it. Alternatively, the method "public void Reply (Object reply)" is used as necessary to have the dispatcher output a reply message which will be received using the method "public Object GetReady (Id id)". Alternatively, the method "public Entry Register (Object action)" is used as necessary to register into the dispatcher an action to be processed in the thread. Also, the method "public void Unregister (Entry entry)" is used as necessary to delete an action registered in the dispatcher. When all necessary processing has been complete and so the dispatcher becomes unnecessary, the method "public void Destroy ()" is used to terminate the dispatcher.

When the aforementioned class "Dispatcher" is used as API, since it is not necessary to explicitly state a thread creation and destruction in the program module, namely, it becomes unnecessary to create and destroy a thread for each request message, the program module will not need a management of thread creation and destruction that needs relatively many calculations. Therefore, less processing is required before an action is started based on a request message issued in the program module of the application program. Thus, the program module can be processed with a considerably improved efficiency.

A statement of a program module using the aforementioned class "Dispatcher" as API is shown by way of example in FIG. 5. In the example shown in FIG. 5, the class "Dispatcher" is used as API to define a class "Sample". Also, actions "foo" and "bar" are registered into the dispatcher.

In a program module shown in FIG. 5, the actions "foo" and "bar" are invoked, a thread is created to execute the actions. In this example, however, the class "Dispatcher" is used as API and creation and destruction of the thread are managed by the dispatcher. Therefore, the program module needs no explicit statement of the thread creation and destruction, and thus a program module can be stated very plainly as shown in FIG. 5.

It should be noted that the method "public static Dispatcher Create (int maxThread)" is such that the argument "maxThread" sets an upper limit for a number of threads which are created simultaneously. By using as API the class "Dispatcher" comprising the method "public static Dispatcher Create (int maxThread)", it is possible to easily limit the number of threads executable simultaneously in a program module which receives a request message to effect an action.

Figure 6:
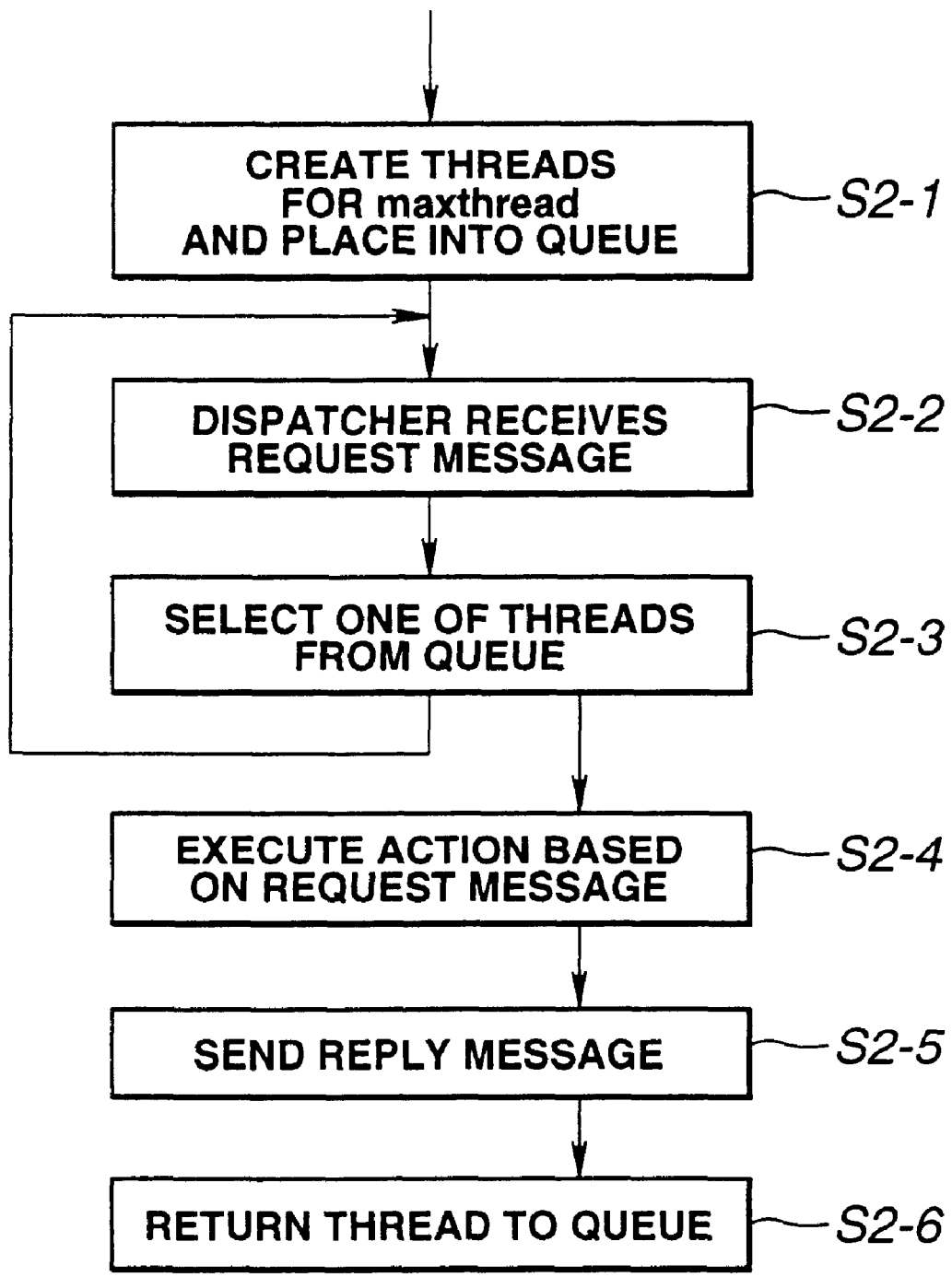
FIG. 6 illustrates a flow of a processing in which a dispatcher is used to set an upper limit for a number of threads which are created simultaneously.

A flow of processing for setting with the argument "maxThread" an upper limit for a number of threads which are created simultaneously is shown in FIG. 6.

As shown in FIG. 6, first at Step S2-1, the method "public static Dispatcher Create (int maxThread)" is used to start the dispatcher. At this time, a number, set with the argument "maxThread", of threads is created and placed into a queue.

The dispatcher started at Step S2-1 monitors whether a request message exists. When receiving the request message at Step S2-2, the dispatcher selects one thread from the thread queue at Step S2-3. In the thread thus selected, an action requested with the request message is effected at Step S2-4.

For a processing for the action to return a reply message, the action results in a reply message at Step S2-5. In the thread, the action completely executed is returned to the queue at Step S2-6.

By previously creating a number, set with the argument "maxThread", of threads, selecting one thread from the thread queue each time the dispatcher receives a request message, and effecting an action requested with the request message in the thread, it is made unnecessary to create and destroy threads each time a request message is received, so that processing corresponds to a plurality of request messages can be effected with an extremely high efficiency.

Further, by setting "1" for the argument "maxThread", the dispatcher can also be used as an inter-thread mutual exclusive means in a programming of a plurality of threads. That is to say, actions which should never be effected simultaneously can be inhibited from being done simultaneously by registering them into a dispatcher of maxThread=1.

In the foregoing, an object-oriented OS has been described. In the recording medium according to the present invention, however, an OS which is not oriented for any object can be used. In this case, the OS may comprise as API commands for similar functions to those of the methods which have been described in the foregoing.

More particularly, the OS not oriented for any object may comprise as API a command to start a dispatcher, a command to terminate the dispatcher, a command to register into the dispatcher what is processed in the thread, a command to pass to the dispatcher a request message which needs no reply message, a command to have the dispatcher output a reply message, a command to receive the reply message from the dispatcher, and a command to delete what is registered in the dispatcher and to be processed in the thread.

The command to start the dispatcher corresponds to the above-mentioned method "public static Dispatcher Create (int maxThread)". The command to terminate the dispatcher corresponds to the method "public void Destroy ()". The command to register into the dispatcher what is processed in the thread corresponds to the method "public Entry Register (Object action)".

The command to pass a request message which requires no reply message corresponds to the method "public void Send (Entry function, byte [] params, int paramSize)". The command to pass to the dispatcher the request message needing no reply message corresponds to the method "public Id Ask (Entry function, byte [] params, int paramSize)".

The command to have the dispatcher output a reply message corresponds to the method "public void Reply (Object reply)". The command to receive the reply message from the dispatcher corresponds to the method "public Object GetReply (Id id)". The command to delete what is registered in the dispatcher and to be processed in the thread corresponds to the method "public void Unregister (Entry entry)".

It should be noted that the present invention is not limited in kind and field of application of application program to any special ones if the application program can be executed using the above-mentioned operating system. The present invention is specially effective for an application program which should be processed in a plurality of threads.

What is claimed is:

1. A computer-readable recording medium for storing an operating system that includes application program interfaces comprising:

means for starting a thread management program which receives a request message to create a thread and processes the thread based on the request message;

means for passing the request message to the thread management program;

means for limiting threads simultaneously possible in the thread management program by setting an upper limit of threads created simultaneously and setting a predetermined number of threads to be created to a smaller number than the upper limit of threads, creating the predetermined number of threads, forming a thread cue including the predetermined number of threads, selecting one thread from the thread cue each time the thread management programs receives the request message, executing an action requested by the request message, sending a reply message, and returning the one thread to the thread cue;

means for notifying the thread management program to output the reply message;

means for receiving the reply message;

means for terminating the thread management program;

means for registering into the thread management program the action to be processed in the thread; and means for deleting the action registered in the thread management program.

2. A computer for executing an application program using an operating system that includes application program interfaces comprising:

means for starting a thread management program which receives a request message to create a thread and processes the thread based on the request message;

means for passing the request message to the thread management program;

means for limiting threads simultaneously possible in the thread management program by setting an upper limit of threads created simultaneously and setting a predetermined number of threads to be created to a smaller number than the upper limit of threads, creating the predetermined number of threads, forming a thread cue including the predetermined number of threads, selecting one thread from the thread cue each time the thread management programs receives the request message, executing an action requested by the request message, sending a reply message, and returning the one thread to the thread cue;

means for notifying the thread management program to output the reply message;

means for receiving the reply message;

means for terminating the thread management program;

means for registering into the thread management program an action to be processed by the thread, and means for deleting the action registered in the thread management program.

* * * * *